(12) United States Patent
Kirschbaum et al.

(10) Patent No.: US 6,844,542 B2
(45) Date of Patent: Jan. 18, 2005

(54) MARKED PLATE FOR A ROTATIONAL ANGLE SENSOR ELEMENT, AN ANGULAR SENSOR ELEMENT FOR ROTATING STRUCTURAL PARTS, AND A PROCESS FOR DETERMINING A REFERENCE VALUE

(75) Inventors: Paul Kirschbaum, Seiersberg (AT); Klaus Leitmeier, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/146,318

(22) Filed: May 15, 2002

(65) Prior Publication Data

US 2002/0170187 A1 Nov. 21, 2002

(30) Foreign Application Priority Data

May 17, 2001 (AT) ........................................ GM394/2001

(51) Int. Cl.$^7$ .................................................. G01D 5/34
(52) U.S. Cl. .............................. 250/231.13; 250/231.17
(58) Field of Search ........................ 250/231.13, 231.14, 250/231.17; 341/11, 13

(56) References Cited

U.S. PATENT DOCUMENTS 4,240,069 A * 12/1980 Hullein et al. .................. 341/7
5,382,792 A    1/1995 Hurst et al.

FOREIGN PATENT DOCUMENTS

| DE | 40 30 229 A1 | 3/1992 |
| DE | 41 08 954 A1 | 9/1992 |
| EP | 0 964 222 A1 | 12/1999 |

* cited by examiner

Primary Examiner—Que T. Le
(74) Attorney, Agent, or Firm—Sonnenschein Nath & Rosenthal LLP

(57) ABSTRACT

The invention involves a marked plate for a rotational angle sensor element for rotating structural parts, with many angle marks provided preferably oriented radially to the rotational axis and preferably arranged in the form of a collar arranged concentrically to the rotational axis and with at least one reference mark, which is formed by an angle mark that deviates in its modulating properties and thus is integrated in the collar of the angle marks. An angle sensor element system for rotating structural parts includes a marked plate that can be coupled to the rotating structural part and that merely has a collar of angle marks with integrated reference marks and a fixed scanning unit for it, including at least one transmitter of electromagnetic radiation and at least one receiver for the radiation modulated by the marked plate, as well as mechanisms for connection to an evaluation unit. In order to distinguish the reference marks with certainty from the remaining angle marks, a process for determining a reference value from an analog signal provides that for each angle and reference mark, from an analog peak value of the preceding angle marks, an peak value continuing the trend of peak values is determined and is used in the evaluation unit, changed by a defined value, as a threshold for the presence of the reference value that deviates in its modulation.

15 Claims, 8 Drawing Sheets

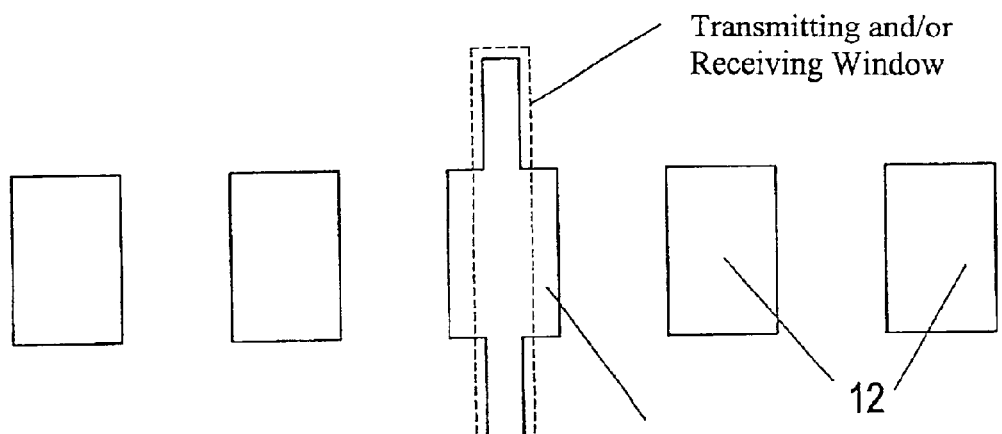
FIG. 7 a
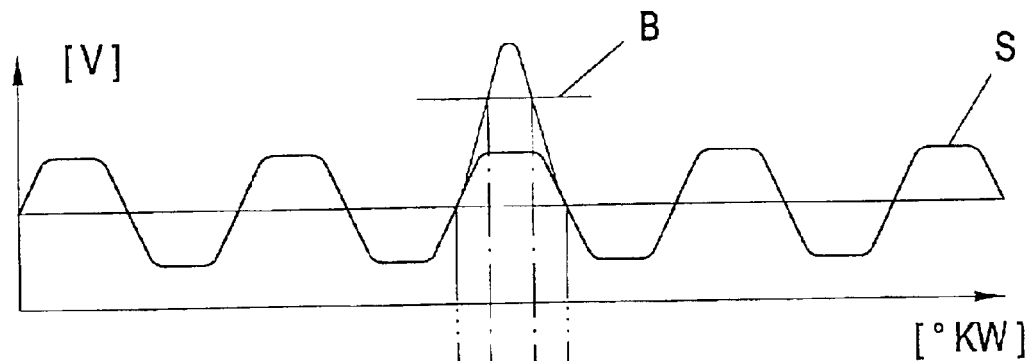
FIG. 7 b
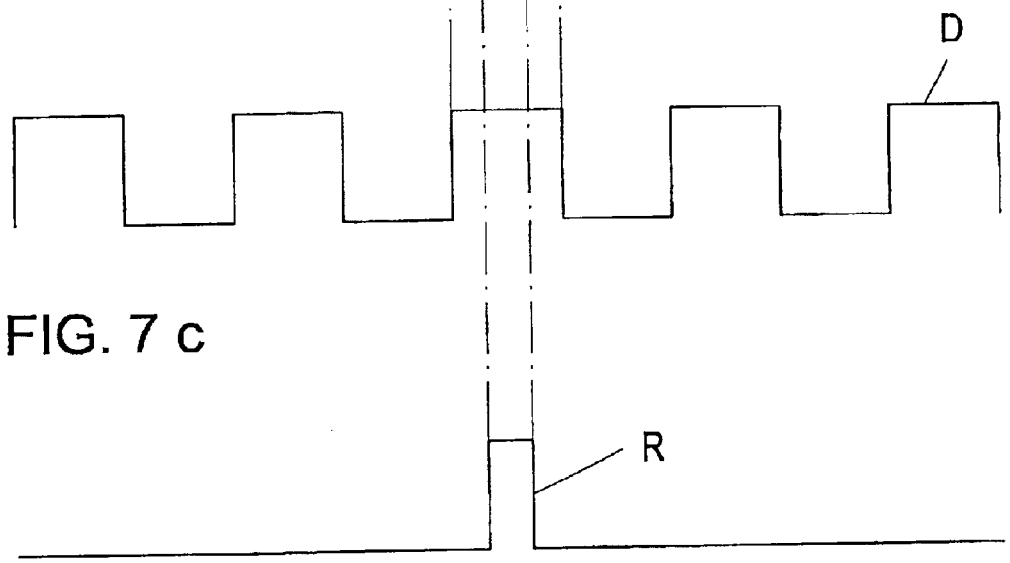
FIG. 7 c
FIG. 7 d

MARKED PLATE FOR A ROTATIONAL ANGLE SENSOR ELEMENT, AN ANGULAR SENSOR ELEMENT FOR ROTATING STRUCTURAL PARTS, AND A PROCESS FOR DETERMINING A REFERENCE VALUE

BACKGROUND OF THE INVENTION

The invention involves a marked plate for a rotational angle sensor element for rotating structural parts, in particular, rotating shafts, with many angle marks provided preferably oriented radially to the rotational axis and preferably arranged in the form of a collar arranged concentrically to the rotational axis and with at least one reference mark, furthermore, an angular sensor element for use with the marked plate, and including a fixed sensor unit for the angle marks, including at least one transmitter of electromagnetic radiation and at least one receiver for the radiation modulated by the marked plate, as well as mechanisms for connection to an evaluation unit, and also a process for determining a reference value from an analog signal, which is obtained by the modulation of a transmitter signal through many angle marks and at least one reference mark that deviates in the quality of the modulation relative to the angle marks, whereby the modulated signal is received by a receiver and supplied to an evaluation unit and digitalized further if need be.

The measurement and display of the current angular position of a rotating part in real time, i.e., with negligibly small signal delay, is necessary in many areas of technology. For example, both in research and development, as well as in the mass-production application of internal combustion engines, angular sensor elements for the current angular position of the crankshaft or the camshaft(s) are used. For this, different measurement principles are used.

An especially advantageous system uses an angle marked plate, which can be mechanically connected to the rotating part, and a sensor device for scanning the angle marks that are located on the plate and typically arranged radially to the rotational axis and preferably concentrically around this axis. For this purpose, two measurement channels are provided with which two lines of angle marks are scanned independently of each other using two sensor systems, namely an incremental track with many equal angle marks that are equidistant, for example, 720 angle marks per revolution, and a reference track with, for example, one reference mark per revolution. The rotational angle position of the plate—and thus also the rotating part—can be determined from the angle mark signals of the incremental track and in reference to the reference marks—which, for example, can identify the position of the upper dead center of one of the cylinders of a piston engine. The sensory device is preferably an electro-optical system, which scans the angle marks by transmitted light or by reflected light and after a possible digitalization, supplies them to a display and/or evaluation device. In the process, the form of the angle marks and the sensitivity characteristic of the sensors are tuned to each other, preferably also the radiation emission characteristic of the transmitter, whereby in general, lengthwise, slit-type transmission and receiving windows are oriented to dash-shaped angle marks, both radially to the rotational axis and essentially parallel to each other. For the conditioning of the sensor signals, an analog electronic system is provided with the smallest possible time delay, whereby from the amplified analog signals of the angle mark sensors, using fast comparators, digital trigger signals are derived that show the time point at which the respectively associated rotational angle has been reached. Digital signal processors until now have not proven themselves worthy because of the calculation times and the unavoidable time delay associated with them, whereas the system explained above especially ensures, in a manner that is clear to the user, the absolute angle position measurement of a rotating part with high precision and angle resolution and with a negligibly small time delay between a specific position of the part and the output of the associated electric signal.

However, systems like those explained above have the disadvantage that the two—or in cases of several tracks, even several opto-electrical measurement channels are expensive, require space and do not contribute in an insignificant manner to the weight and/or the mass of the measurement arrangement. Both structural size as well as mass are decidedly disruptive, especially for small engines with high rotational speeds, in which each additional (centrifugal) mass on the crankshaft can be clearly noticed, or for engines already installed in vehicles and the spatial ratios that are narrowed as a result and/or also in relation to the large centrifugal accelerations, to which the measurement device is exposed in practical operation in internal combustion engines.

As a result, simple and inexpensive solutions have been proposed, which have only one measurement channel, often an inductive sensor, and for which the reference position is given by a deviation from the otherwise equidistant arrangement of the angle marks. For example, in collar gears, teeth are left out in order to identify the reference position. Using the currently measured rotational angle speed and/or from the expected time duration of the following rotational angle interval, the evaluation unit detects the missing teeth and shows that the reference position has been reached. By extrapolation from the respectively preceding duration of a rotational angle interval, the missing angle mark signals can also be simulated. However, this is associated with the significant disadvantage of the clearly reduced accuracy of the continuous rotational angle measurement since in the angle mark gaps necessary for the coding of the reference position, the current rotational angle information is missing, so that both the reference position as well as the current rotational angle speed can only be given approximately. Moreover, the necessary calculations require a significant time delay. Thus, a system of this type for research and development, for analysis of rotational unevenness and rotational vibrations of internal combustion engines, for example, or also the precise crankshaft-synchronous measurement data detection, is too imprecise or only conditionally useable.

SUMMARY OF THE INVENTION

The purpose of the invention presented here is thus an improvement of the system described at the beginning, and/or its components, which in an economic manufacturing allows the largest possible reduction of the structural size and mass, thus a clear improvement of the vibrational stability under load and the maximum permissible rotational speeds. In the process, in spite of the maximum accuracy of the angular resolution that is uniformly ensured via the rotation, there is a negligibly low time delay in the measurement of information from at least two angular-information channels.

This purpose is achieved firstly by an angle marked plate that is characterized according to the invention in that only one track of angle marks is provided and each reference mark is formed by an angle mark that deviates in its modulating properties from the remaining angle marks. This means an implementation of a polyvalent logic system in the construction of angle marks, which in corresponding adaptation of the sensory scanning and the subsequent signal evaluation, stays available and makes information accessible from two or more angle information channels with only one scanning sensory system. Also, the need for a measurement principle that is understandable for the user and is possible in real-time can thus be fulfilled. The additional information (for example, about the reference position) is contained in the same channel as the primary information (for example, the continuous angle positions), independently of the primary formation and without a gap being necessary or occurring in it.

On the other hand, for the case of an angle sensor element arrangement with several measurement channels, it is possible to equip not only one channel according to the invention with a polyvalent logic system, but instead two or more channels so that at a low expense, for each individual channel (large distances between the individual values of the polyvalent logic and thus easy distinction of this value) a large amount of information can thus be determined.

In a simple way, a modulation of a transmitted signal can be achieved both for reflection as well as for transmitted light, if the reference marks have a different surface relative to the angle marks. The different surfaces and the values of the scanning signal resulting from it represent in the process the different values of the polyvalent logic, whereby the many equivalent values characterize the consecutive angle marks and the at least one other deviating value functions as a reference mark. The general application of the principle according to the invention is not principally limited based on a three-valued logic system, and even more information can be put in only one channel by a four or even higher valency logic system. This surface coding, however, can not only be applied in optical measurement processes where it leads to a brightness coding (for example: dark-light-double light), but instead, for example, also in capacitive processes. In principle, polyvalent angle mark tracks can, however, be made for all types of scanning principles, whether they are capacitive, inductive, optical, acoustic, or other measurement processes.

Especially simple for the evaluation is an embodiment variation, in which the reference marks have a larger area than the angle marks. In this process, the threshold for detection of the deviation of the reference mark from the angle marks can be implemented and defined in an especially simple manner.

Advantageously, the surface coding is done in a form so that the angle resolution is not made worse, whereby according to an additional characteristic of the invention, the reference marks are extended relative to the angle marks in the radial direction. In this way, the dash width that is determinant for the angle resolution stays equal in the circumferential direction and the triggering of the reference signal is done at exactly the same distance as that of a traditional angle mark.

Advantageously, it is provided in the process that the radial extension of the reference marks has a smaller width relative to the angle marks in the circumferential direction of the plate. By this design of the reference mark, the same edge steepness is also obtained at the start of the scanning by the receiving window as for all other angle marks, so that the signal progression of all marks at the point in time of the significant triggering has the same progression. Only after the starting edge has achieved the new, stable signal value for the "usual" angle marks, should, in the case of a specially labeled reference mark, the additional signal increase be applied to the deviating peak value, which is achieved by the graduated dash lengths-variation described.

In a similar way, the effects explained above can be obtained when, according to another embodiment form according to the invention, each angle mark comprises at least two radially arranged angle mark-sections set off at a distance from each other at essentially equal width in the circumferential direction of the plate and the radial extension of the reference marks comprises a section that connects these two angle mark parts.

If, for example, because of mechanical interference effects or a deficient adjustment, the receiving window of the sensor is not oriented exactly parallel to the angle marks and/or exactly parallel, the error resulting from this can be kept to a minimum if the angle and/or reference marks are constructed symmetrically in the radial direction. For the symmetrical design of the angle and/or reference marks in relation to the rotational direction, i.e., symmetrically to the dash thickness center, the marked plate provides, in both rotational directions, an equal, comparatively insensitive signal in relation to the embodiment form of the receiving window.

According to one embodiment form of the invention, it can be provided that the angle and reference marks are formed through radiation-permeable areas of the marked plate. This is especially advantageous for transmitted light systems in which the marks can be made by openings in an otherwise light-impermeable plate.

Another embodiment form of the invention provides that the angle and reference marks are formed through reflecting surfaces on the marked plate, which is conceived as a variation for measurements in reflected light.

For this last type of measurement variation, instead of a surface coding, it can also be provided that the reference marks have, as opposed to the angle marks, a reflection coding, preferably, a reflection coefficient that differs from the angle marks. In the process, the considerations that are relevant for the design of the surface coding are logically also applied for the reflection coding. A reference mark is thus formed by an angle mark with, for example, high reflection, by an angle mark with an integrated zone with high reflection. Thus, all errors, which can occur by the surface deviation between angle and reference marks, can be completely avoided.

The purpose stated above is also achieved by an angle sensor element which is characterized according to the invention in that the marked plate has only one track of angle marks, the reference mark or each reference mark is formed by an angle mark that deviates in its modulating properties, and that only one transmitting and/or receiving window at a time is provided directed at the track of angle marks. This means an implementation of a polyvalent logic system in the construction of angle marks which, with the corresponding adaptation of the sensory scanning and the subsequent signal evaluation, allows that information from two or more angle information channels is made accessible with only one scanning sensory system. In this way, the number of scanning channels can be reduced and in the best case minimized to one scanning sensory system. On the other hand, for the case of an angle sensor element arrangement with several measurement channels, it is possible not only to equip one channel according to the invention with a polyvalent logic system, but two or more channels, so that with a low expense for each individual channel (large distances between the individual values of the polyvalent logic system and in this way, easy distinguishing of these values) a large amount of information can be calculated.

In order to make the triggering exact and uniform for all marks, it is provided that the transmitting and/or receiver window has a lower width in the circumference direction of the marked plate relative to the angle marks.

According to a first embodiment form, each receiving window is located on the side of the marked plate that lies opposite the associated transmitting window, in order to make possible a scanning sensory system on the transmitted light principle.

According to another embodiment form of the invention and with the advantage of another simplification of the design of the angle receiving arrangement it is provided that each receiving window is located on the same side of the marked plate as the associated transmitting window. In this way, lines can be laid to the transmitter and receiver to the greatest extent through the same protective sheaths and line splittings and/or an enlargement of the installation room for the transmitter and receiver that increases the spatial requirement can be prevented and/or minimized.

The advantage named last is used to the largest possible extent, when according to another characteristic of the invention, the transmitting and receiving window coincide and this common window has at least one outlet point for the radiation directed at the marked plate as well as at least one intake point for the radiation reflected by the marked plate. This combination of transmitting and receiving window can, for example, be achieved by a distribution of the entire transmitting and receiving surface at many small points, preferably intake and outlet points in and/or out of the individual optic fibers.

For the angle sensor elements described above, in order to solve the purpose named at the beginning, a process is also suitable that is characterized according to the invention in that for each angle and reference mark, from an analog peak value or average value of the preceding angle marks, a extreme or average value continuing the trend of values is determined and is used in the evaluation unit, changed by a defined value, as a threshold for the presence of the reference value that deviates in its modulation. The determination of the angle position based on the normal angle marks is done advantageously in following the tested methods as explained at the beginning, i.e., by generating a signal that follows the analog input signal in phase and amplitude and determining the intersection points as trigger points for the digitalized angle signal on the signal edges through fast comparators. This process is also applied for the reference mark in the same way. In order, however, now independently from the temporary changes of the signal level or null point changes of the sensor signals or the like, to distinguish the reference mark certainly from the remaining angle marks, the continuing analog-electronic tracking of the trigger level for the reference position is provided according to the invention, in which a current average value of the sensor signal is determined and the trigger threshold is defined by addition or subtraction of a preset fixed voltage or by multiplication by a preset factor. In the same way, of course with a small constantly added or subtracted level and/or an adapted multiplication factor, an peak value of the sensor signal can even be used from the start.

Advantageously and based on circuit technology, in a very simple way, the previously generally explained process can be used, if according to another characteristic of the invention, for each angle and reference mark, from an analog brightness, average or peak value of the previous angle marks, an average value or peak value corresponding to the trend of values is determined and is used, changed by a defined value, as a threshold for the presence of the reference value that deviates in its brightness in the evaluation unit.

In an advantageous form of the process, in which the modulation of an electromagnetic radiation of the transmitter is done by the angle and reference marks in the form of a corresponding change of the reflected or transmitted radiation, it is provided according to the invention, that analog intensity values are determined and evaluated.

In the following description, the invention is to be explained in greater detail in reference to the attached drawings of a preferred embodiment example of a crankshaft-sensor element system according to the invention, without, however, limiting it in any way.

BRIEF DESCRIPTION OF THE DRAWING

FIG. 7a schematically illustrates a series of angle marks with an intervening reference mark in accordance with an embodiment of the invention.

FIG. 7b schematically illustrates an analog signal received when using the angle and reference marks of FIG. 7a.

FIG. 7c schematically illustrates a digitalized signal derived from the analog signal of the angle marks of FIG. 7b.

FIG. 7d schematically illustrates a digitalized signal derived from the analog signal of the reference marks of FIG. 7b.

DETAILED DESCRIPTION OF THE PREFERRED EMBODIMENTS

Figure 1:
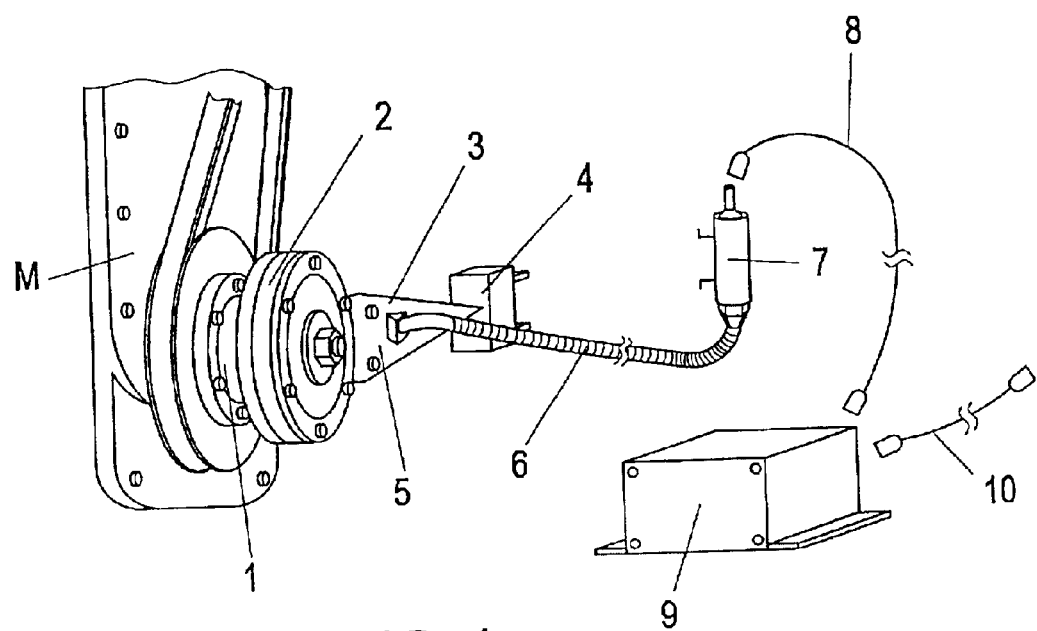
FIG. 1 shows a partially schematic view of an angle sensor element system mounted on an engine.

In the following description, as a preferred application example for an angle sensor element according to the invention, a crankshaft sensor element for engines is explained in greater detail, as it can be applied as a basis for indexing technology. For the indexing of internal combustion engines, the pressure is measured in the combustion chamber. In order to obtain a continuous pressure curve, the pressure values must be precisely allocated to the respective crankshaft positions. Because of the cyclical irregularities, the angular speed of the crankshaft is not uniform. Each time-based data recording would thus not produce a correct allocation to the crankshaft. A crankshaft sensor element allows a correct allocation to the current crankshaft, independently of the rotational speed. Furthermore, a correct identification of the upper dead center is still required. Independently of the different tasks, different angle resolutions are required (typically 1 to 0.1 degrees). Since physical limits prevent the application of 3600 markings (for 0.1 degree resolution) on the limited circumference of a plate, normally one electronic pulse multiplier is necessary. High resolutions of 0.1 to 0.2 degree are, for example, for tests in regard to the injection time point or for detailed tests of the engine knock. For only combustion chamber pressure measurements or IMEP calculations, a 1 degree resolution would be sufficient. Normally, two positions come into question for the mounting of a crankshaft sensor element on the engine: the open crankshaft end or the drive train immediately on the engine. Mounting positions on the camshaft or another flexible shaft should be avoided for purposes of combustion pressure measurements, since because of the play (torsion) in these indirect measurements, large errors can occur between the crankshaft and the measured position. The usual measurement accuracy is +/−0.1 degree on the crankshaft.

The application of the angle markings on the free end of the shaft and a pressure sensor element on the adjacent cylinder produces the best results and is thus preferred. At this position, the minimum of the crankshaft torsion is to be expected. In FIGS. 1–4, a view of a crankshaft sensor element system is shown, which is affixed on the free end of the crankshaft. The sensor element unit consists of a flange connection 1, a closed housing 2, in which a marked plate with 720 crankshaft marks applied on its surface, among them at least one reference mark, runs, and a carrier arm 3 affixed to the housing 2 with a clamping device 4 for mounting onto the engine block M. The carrier arm 3 and the clamping device 4 are designed in such a way that the carrier arm has movement freedom in the direction normal to the crankshaft axis, but is supported on the engine block M axially and radially to the crankshaft through the clamping device. The angle sensor element typically contains a doubled titanium shaft unit typically set in deep groove ball bearings and the housing 2 preferably consists of a high-strength aluminum alloy. The carrier arm 3 is designed near to the housing 2 preferably as a thin, flat metal plate 5, i.e., in the form of a leaf spring, so that the carrier arm 3 can be elastically deformed from out the plane of the metal plate 5, but is rigid in the plane of the metal plate 5. In this way, a wobbling movement on the end of the crankshaft, which occurs in practical application, is made possible for the housing 2.

A typically approximately 2 m long fiber optic cable 6, preferably made of two separated glass fiber bundles, preferably protected from damage by a metal tube, leads away from the housing 2 to a sensor element electronic system 7. The electronic system 7 contains all components for conversion of the light signal into an electric analog signal (light/voltage transformation) and further into a digital signal. The signal transmission from the sensor element electronic system 7 is done advantageously using the LVDS technology (Low Voltage Differential Signaling) characterized by its high resistance to interference and permitting large cable lengths. The fiber-optic conductors 6 can preferably be separated from the sensor element electronic system 7 and are conducted via plug connections to the plate connections. Next, a connection channel 8 then leads from the sensor element electronic system 7 to a pulse transformer 9, whereby the cable is preferably of the plug-in type, typically approx. 5 m long, and can be cascaded. The pulse transformer 9, which synchronizes the received signals and converts them into TTL-signals, can be equipped with a pulse multiplier in order to increase the resolution. It can be connected via an additional connection cable 10 directly to indexing equipment. If need be, an independent energy supply unit can also be provided. The electric components are not in direct engine contact and thus not exposed to any mechanical effects (vibrations) as well as advantageously mounted in a protected manner in regards to the temperature load and electric interference.

Figure 2:
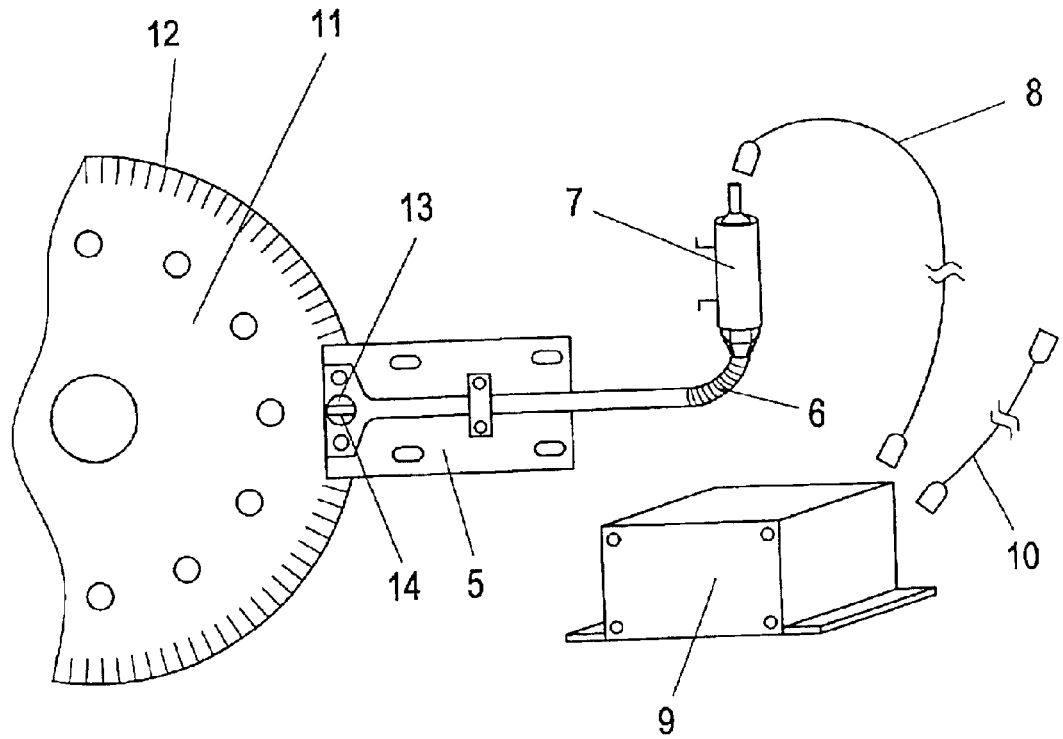
FIG. 2 is a schematic side view of a system in which marked plate and sensor are mounted separated from each other.
Figure 3A:
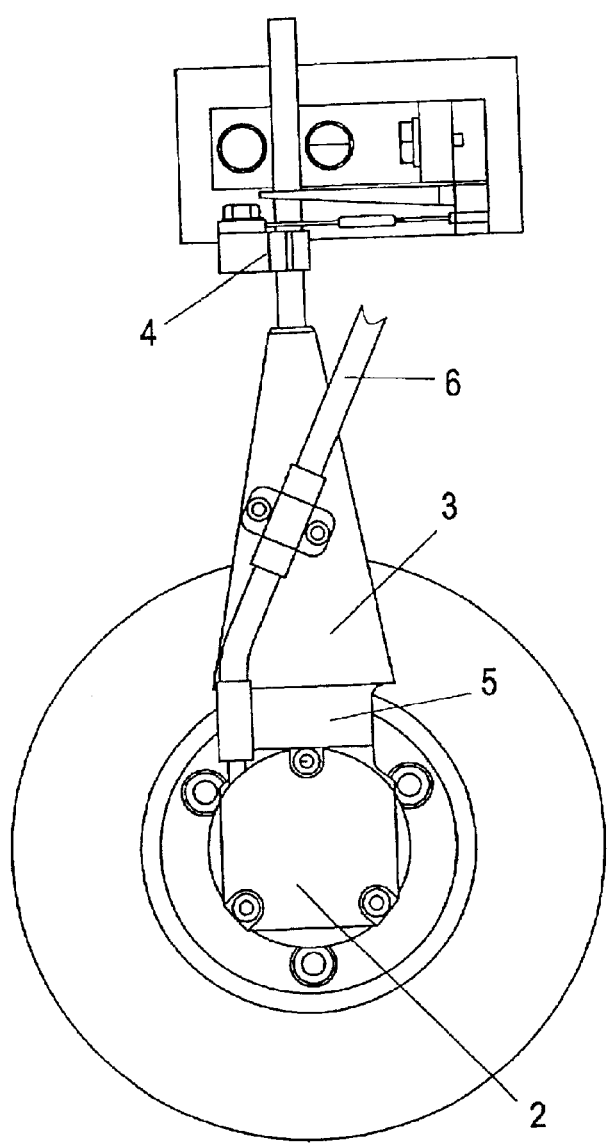
FIG. 3a is an overhead view of the system of FIG. 1.
Figure 3B:
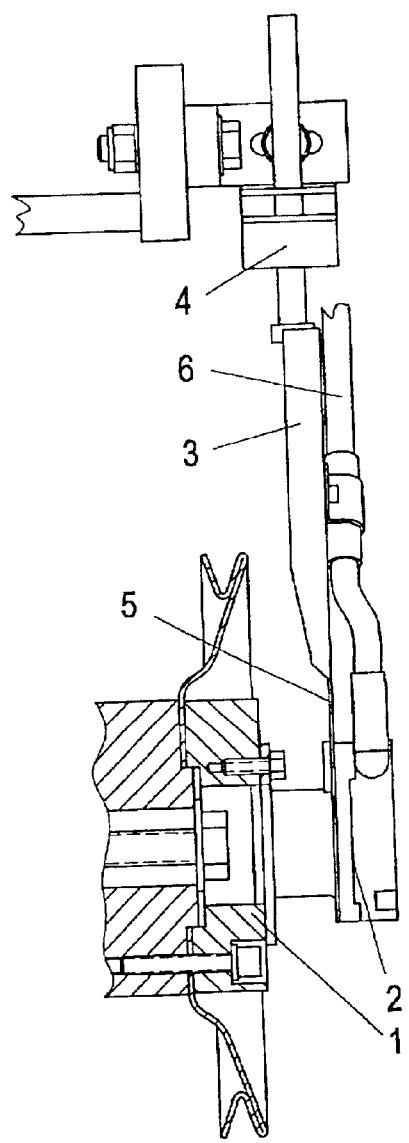
FIG. 3b illustrates a partial section view through the system of FIG. 1.
Figure 4:
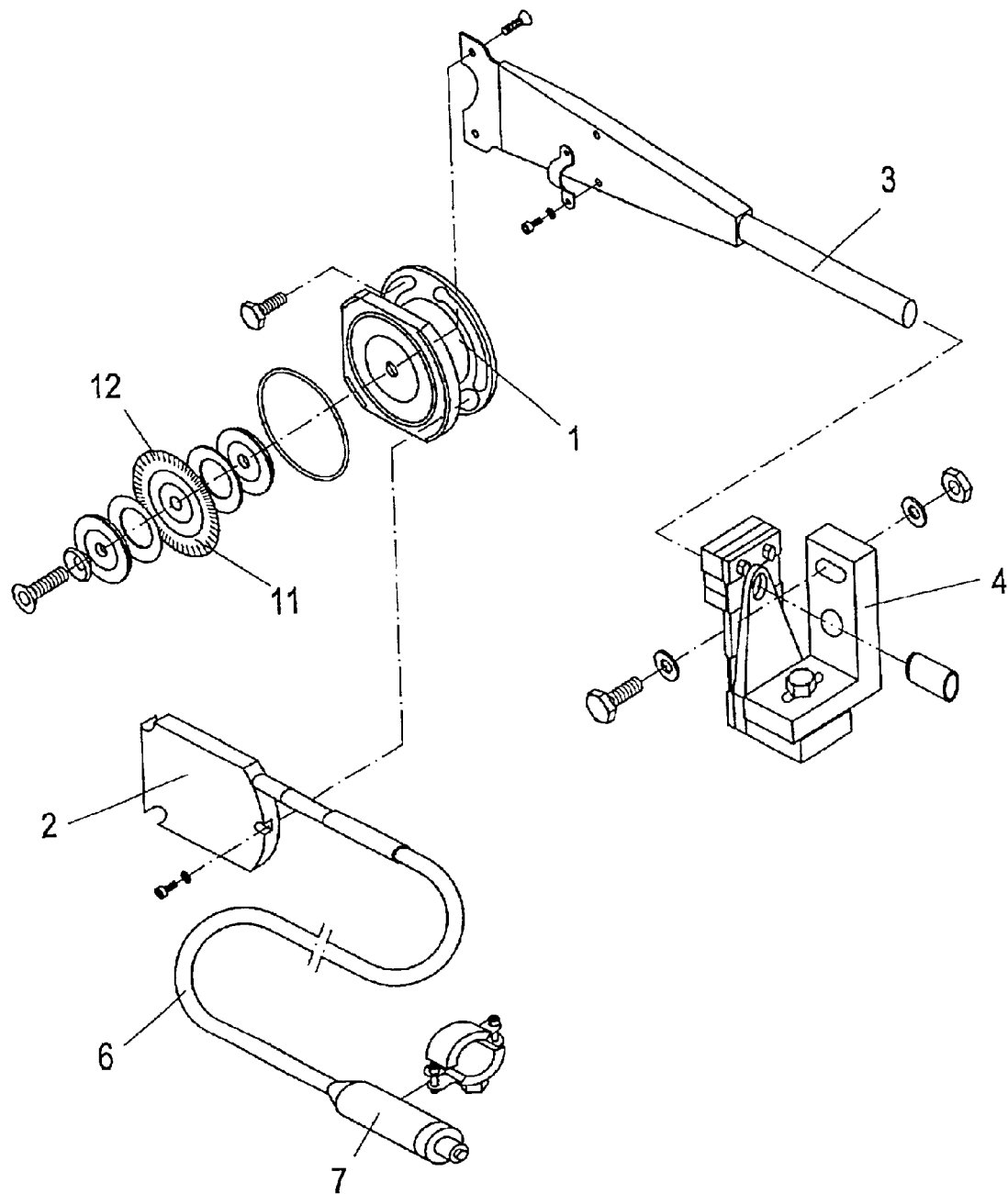
FIG. 4 is an exploded diagram of the system of FIG. 1.

FIG. 2 shows a situation in which marked plate 11 and sensor 13 are mounted separated from each other. The marked plate 11 of the crankshaft sensor element system, for example, affixed via clamping plates onto the shaft, can be seen with the angle marks 12 applied on it. Typically these angle marks 12 are designed as many markings oriented preferably radially to the rotational axis and preferably in the form of a collar arranged concentrically to the rotational axis of the marked plate 11, whereby for triggering at least one reference mark must be provided, of course. According to the invention presented here, the marked plate 11 is provided with only one track of angle marks 12 and the reference mark or each reference mark, as explained in greater detail further below, is formed by an angle mark that deviates in its modulating properties. Opposite this track of angle marks 12, there is a sensor element head 13, which preferably is attached to the thin metal plate 5. The sensor element head 13 is typically equipped with at least one window slot 14, which themselves are in turn oriented, by the orientation of the sensor element head 13, so that they are parallel to the angle marks 12. In each window slot, one or even two lightguides can end, which form at least one transmission and receiving window.

Figure 5A:
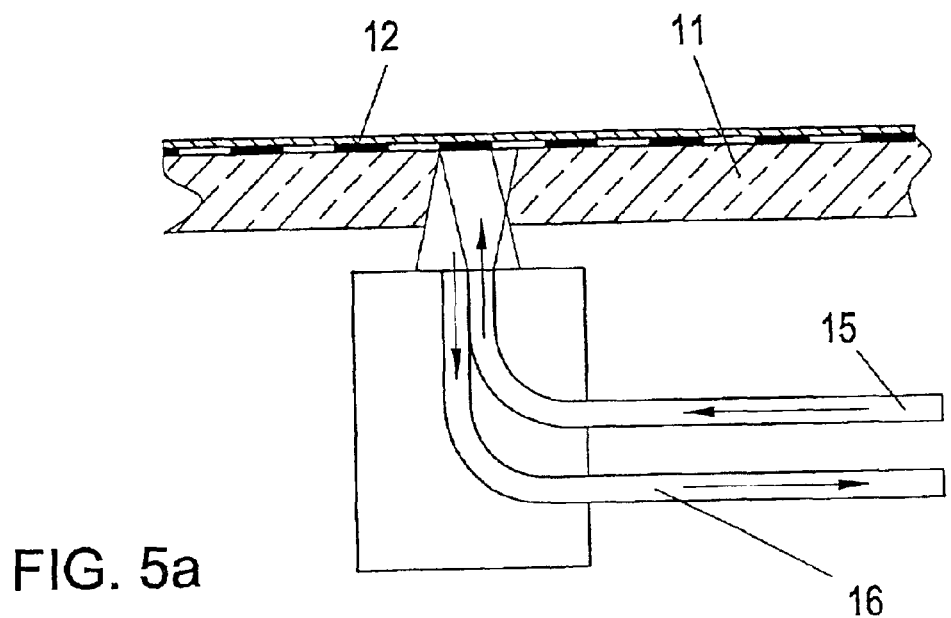
FIG. 5a schematically illustrates an embodiment of an angle sensor element.
Figure 5B:
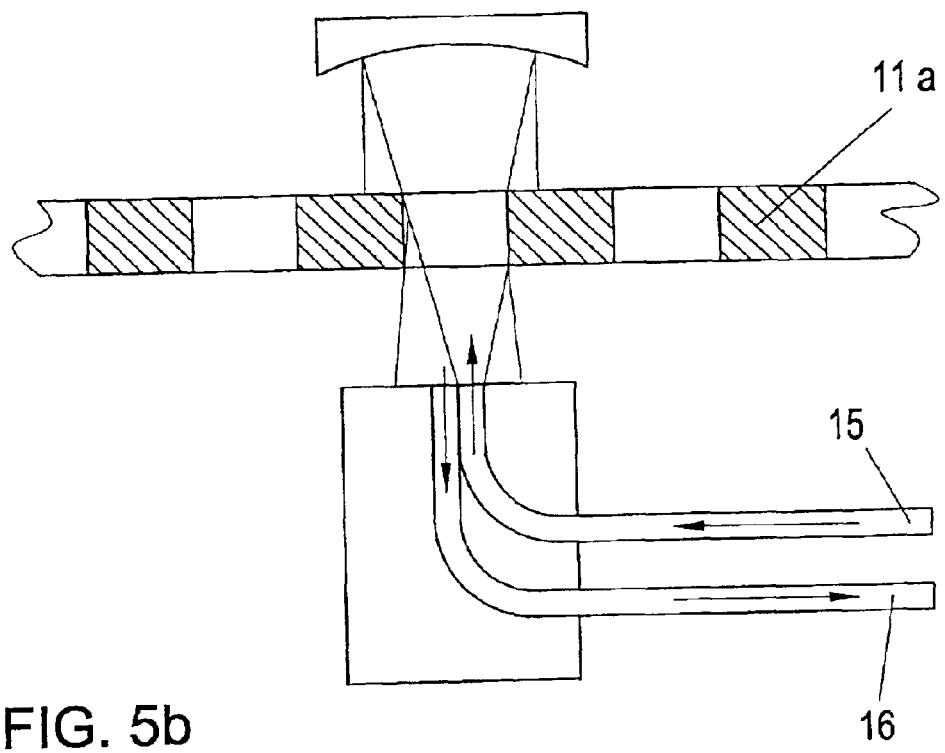
FIG. 5b schematically illustrates an alternate embodiment of an angle sensor element.
Figure 5C:
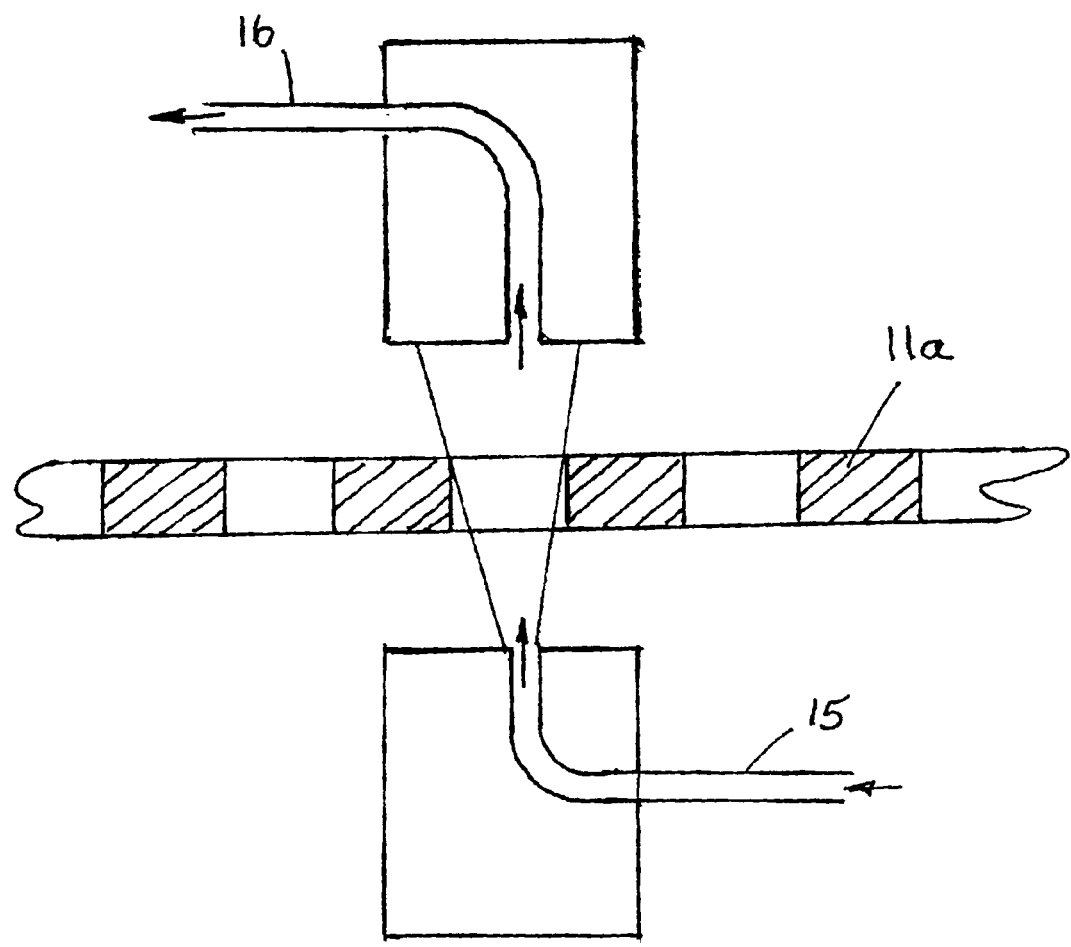
FIG. 5c schematically illustrates an alternate embodiment of an angle sensor element.

The principle function of the angle sensor element is based, as explained schematically in FIGS. 5a, 5b and 5c, on a light source arranged in the receiving electronic system 7, preferably an infrared source, which supplies a constant light intensity via a optical fiber 15 to the marked plate 11. The reflected or received light is conducted via another optical fiber 16 to a photo-element, which is likewise located in the sensor element electronic system 7. In the embodiment form of FIG. 5a, the angle marks 12 are of the reflection type, whereas the rest of the plate 11 is designed to be light-absorbing. In another possible embodiment form, represented in FIGS. 5b and 5c, for example, a slotted steel plate 11a is used. This slotted steel plate 11a is used between sensor and a reflector in FIG. 5b and between the light source and the sensor (without the use of a reflector) in FIG. 5c. The light is let through the slots and blocked by the rest of the plate 11a. If the marked plate 11 or 11a rotates, a sinusoid-like light signal S is generated by the photoelement and the associated electronic system in the receiving electronic system 7, as shown in FIG. 7b. This analog light signal S is converted in the receiving electronic system 7 into a digital electric signal D in the manner explained in the following in FIG. 7c. For this purpose, the amplitude of the received signal S is cut by a switching threshold S'. The intersection points of the two signals S and S' define the transition points of the digital signal D, which is then present in rectangular form and conducted to the pulse transformer 9.

The pulse transformer 9 typically produces 720 crank angle pulses and one trigger pulse. In the process, for the evaluation of the crank angle signal, preferably the negative (falling) edge of the signal is used. Depending on the required resolution and also depending on the type of the indexing system that is connected afterwards, a pulse-multiplier (digital PLL type) can be provided in the pulse transformer housing 9. The resolution can be selected by a switch on the pulse converter 9. If need be, the necessary multiplication circuit can also be integrated itself in the circuit of the pulse transformer 9. Advantageously, the sensor element unit 1 to 7 can be detached easily from the pulse transformer 9. In the test cell, it is functional for time savings if the test engine is still running and the next engine to be tested is already prepared outside the cell by mounting of another sensor element unit.

Figure 6A:
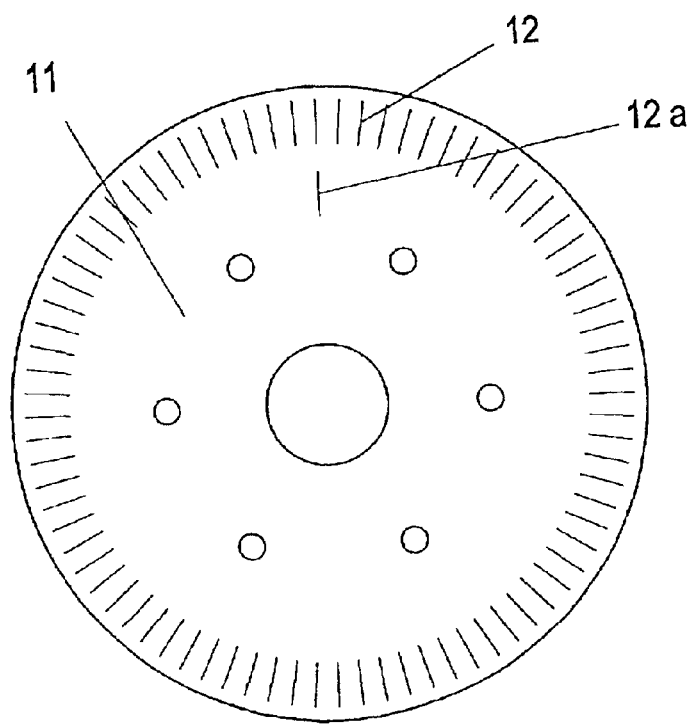
FIG. 6a illustrates a prior art marked plate.
Figure 6B:
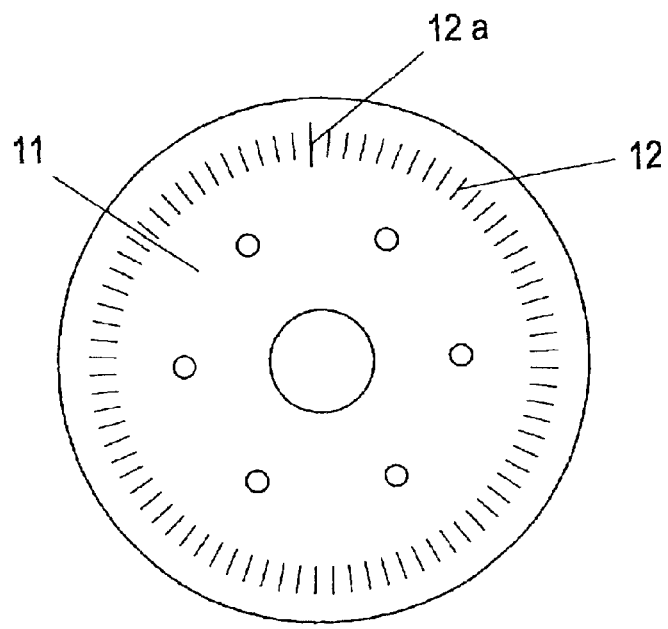
FIG. 6b illustrates a marked plate according to the principles of the present invention.

The marked plate 11 used for the reflection process according to, for example, FIG. 5a, consists of a polycarbon with a light-absorbent layer and reflecting angle marks 12. As is explained in connection with FIGS. 6a and 6b, the necessary reference mark 12a according to the invention, which is provided in marked plates according to the state of the art (FIG. 6a) in a track that is separate from the angle marks 12, is integrated into the track of the angle marks. The reference mark 12a is formed according the invention presented here by an angle mark 12 deviating in its modulating properties, and preferably the reference mark 12a has for this purpose a different, preferably larger area relative to the angle marks 12. For this purpose, the reference mark 12a, as shown in FIG. 7a, is prolonged in the radial direction relative to the angle marks 12, but also if need be or alternatively to that, in the circumferential direction. The radial extension has the advantage that the resolution in the circumferential direction, i.e. the angle resolution at the position of the reference mark 12a, does not deviate from each of the customary angle marks 12. Another embodiment of the marked plate 11 provides its manufacture as a laser-cut marked plate made of high-strength steel. The possible outside diameter depends, in all cases, on the required maximum rotational speed and the vibrations that occur.

Advantageously, the radial extension of the reference marks 12a has a lower width in the circumferential direction of the plate 11 relative to the remaining angle marks 12 and thus also relative to the central section of the reference marks 12a, so that as shown in FIG. 7b, the beginning and the end of the edge progression of the analog light signal S does not differ at the reference mark 12a from the progression at each other angle mark 12. Thus, there is the same edge steepness for each mark 12 or 12a on the marked plate in the lower area of the analog light signal S, which ensures an identical signal form of the digitalized signal D (see FIG. 7c) for all marks 12 and 12a and thus a constant angle resolution over the entire circumference of the marked plate 11. Only according the lowest edge curve, identical for all angle marks 12 and 12a, does the signal level of the analog light signal S increase for the reference mark 12a as shown in FIG. 7b and exceeds finally an evaluation threshold B, whereby the beginning and end of the digitalized reference signal R (FIG. 7d) are given by the intersection points of the signal S with the evaluation threshold B.

Figure 8:
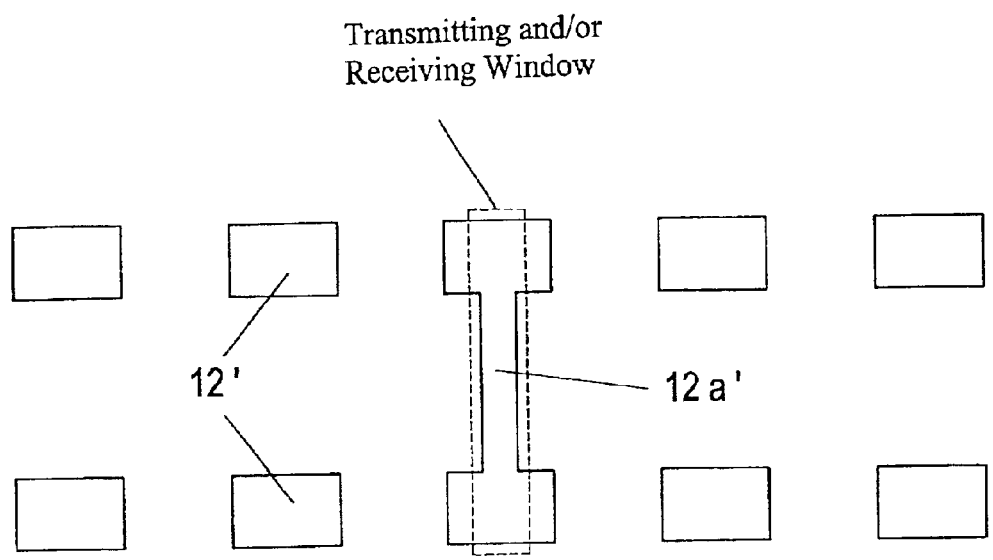
FIG. 8 schematically illustrates a series of angle marks with an intervening reference mark in accordance with an alternate embodiment of the present invention.

In FIG. 8, an alternative embodiment form of the angle marks 12 and the reference mark 12a is shown as an example. Here, each angle mark 12' consists of at least two radially oriented angle mark-sections that are set apart from each other in essentially the same width in the circumferential direction of the plate and the radial extension of the reference marks consists of a section that connects these two angle mark parts.

According to another embodiment form (not shown), the difference between the reference mark 12a or each reference mark 12a and the angle marks 12 can be given via a reflection coding instead of via the surface coding explained above, preferably a high reflection coefficient of the reference marks 12a that differs from the angle marks 12.

Figure 9:
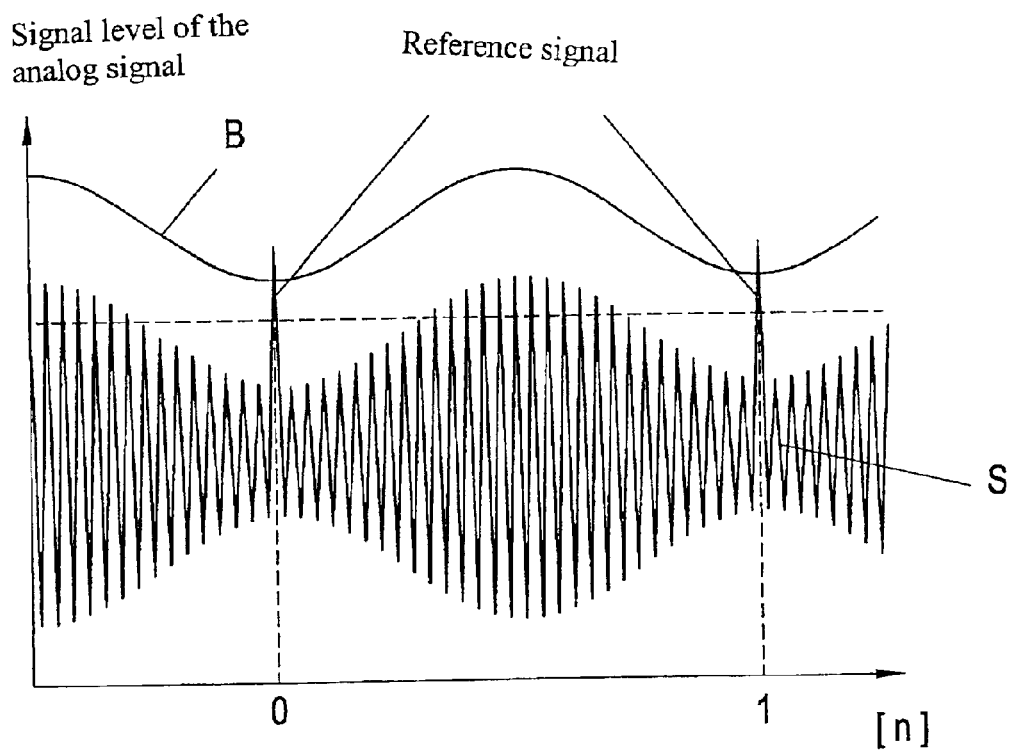
FIG. 9 graphically illustrates the principle of the derivation of the reference threshold for the reference marks as a function of the signal of the angle marks.

In relation to FIG. 9, an especially advantageous process for determining, for example, the evaluation threshold B for the reference signal is explained in conclusion. From the analog light signal S, which is obtained by many angle marks 12 and at least one reference mark 12a that deviates in the quality of the modulation relative to the angle marks 12, this reference mark 12a should be able to be determined with certainty without this determination being impaired by signal drift, local soiling of the marked plate 11 or the like. For this purpose, in a calculation unit of the system for each angle mark 12 or reference mark 12a, an peak value that continues the trend of the peak values is determined from an analog peak value of the preceding angle marks 12 and/or reference mark 12a and used, changed by a defined value, as a threshold B for the presence of the reference value that deviates in its modulation. The evaluation threshold B thus follows the trend of peak values of the amplitudes of the analog signal S, whereby preferably the distance between the evaluation threshold B and the envelope curve of the peak values of the signal S can be changed proportionally, preferably directly proportionally to the magnitude of the peak value. This process is advantageously determined, on account of the high processing speed, for the analog peak value of the intensity of the signal S and evaluated with this signal.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A marked plate for a rotational angle sensor element for rotating structural parts, with many angle marks provided oriented radially to the rotational axis and arranged in the form of a collar arranged concentrically to the rotational axis and with at least one reference mark, wherein only one track of angle marks is provided and the reference mark is formed by an angle mark that deviates in its modulating properties from angle marks remaining.

2. A marked plate according to claim 1, wherein the reference mark has a different surface relative to the remaining angle marks.

3. A marked plate according to claim 1, wherein the reference mark has a larger area than the remaining angle marks.

4. A marked plate according to claim 1, wherein the reference mark is extended relative to the remaining angle marks in at least one of the radial and circumferential direction.

5. A marked plate according to claim 1, wherein the reference mark is extended relative to the angle marks in the radial direction, and the radial extension of the reference mark has a smaller width in the circumferential direction of the plate relative to the remaining angle marks.

6. A marked plate according to claim 1, wherein each angle mark comprises at least two angle mark-sections radially spaced at a distance from each other, and having at essentially equal widths in the circumferential direction of the plate, and a radial extension of the reference mark comprises a section that connects these two angle mark sections.

7. A marked plate according to claim 1, wherein the angle and reference marks are constructed symmetrically in the radial direction.

8. A marked plate according to claim 1, wherein the angle and reference marks are formed by means of radiation-permeable areas of the marked plate.

9. A marked plate according to claim 1, wherein the angle and reference marks are formed by means of reflecting surfaces on the marked plate.

10. A marked plate according to claim 9, wherein the reference mark has, as opposed to the remaining angle marks, a reflection coding, in the form of a reflection coefficient that differs from the remaining angle marks.

11. An angle sensor element for rotating structural parts, including a marked plate that can be coupled to the rotating structural part and that has many angle marks provided oriented radially to the rotational axis and arranged in the form of a collar arranged concentrically to the rotational axis and with at least one reference mark, a fixed sensor unit for the angle marks, including at least one transmitter of electromagnetic radiation and at least one receiver for the radiation modulated by the marked plate, as well as mechanisms for connection to an evaluation unit, wherein the marked plate has only one track of angle marks, the reference mark is formed by an angle mark that deviates in its modulating properties from remaining angle marks, and only one transmitting and/or receiving window at a time is provided directed at the track of angle marks.

12. An angle sensor element according to claim 11, wherein the transmitting and/or receiving window has a smaller width relative to the angle marks in the circumferential direction of the plate.

13. An angle sensor element according to claim 11, wherein each receiving window is located on the side of the marked plate that lies opposite an associated transmitting window.

14. An angle sensor element according to claim 11, wherein each receiving window is located on the same side of the marked plate as an associated transmitting window.

15. An angle sensor element according to claim 14, wherein the transmitting and receiving window coincide and this common window has at least one outlet point for a radiation directed at the marked plate as well as at least one intake point for the radiation reflected by the marked plate.

* * * * *